(12) United States Patent
Cluff et al.

(10) Patent No.: US 6,919,025 B2
(45) Date of Patent: Jul. 19, 2005

(54) PORTABLE DRINKING DEVICE

(76) Inventors: Brent C. Cluff, 3513 W. Church St., Thatcher, AZ (US) 85552; Gary T. Payne, 8902 E. Pine Vall y Dr., Tucson, AZ (US) 85710

( * ) Notice: Subject to any disclaimer, the term of this patent is extended or adjusted under 35 U.S.C. 154(b) by 0 days.

(21) Appl. No.: 10/350,311

(22) Filed: Jan. 23, 2003

(65) Prior Publication Data
US 2004/0144711 A1 Jul. 29, 2004
(Under 37 CFR 1.47)

(51) Int. Cl.[7] .................................................. C02F 1/28
(52) U.S. Cl. ...................... 210/244; 210/455; 210/456; 210/502.1
(58) Field of Search ................................ 210/244, 288, 210/439, 454, 464, 482, 502.1, 455, 456; 215/308, 388, 389; 239/33

(56) References Cited

U.S. PATENT DOCUMENTS

| | | | | |
|---|---|---|---|---|
| 33,281 A | * | 9/1861 | Jennings | ................... 29/890.14 |
| 4,753,728 A | * | 6/1988 | VanderBilt et al. | ......... 210/282 |
| 5,609,759 A | * | 3/1997 | Nohren et al. | .............. 210/266 |
| 6,004,460 A | * | 12/1999 | Palmer et al. | ............... 210/232 |
| 6,117,319 A | * | 9/2000 | Cranshaw | .................... 210/232 |
| 6,153,096 A | * | 11/2000 | Nonren, Jr. | .................. 210/238 |
| 6,193,886 B1 | * | 2/2001 | Nohren, Jr. | .................. 210/282 |

* cited by examiner

Primary Examiner—Matthew O. Savage
(74) Attorney, Agent, or Firm—Dale F. Regelman

(57) ABSTRACT

A portable drinking device is provided that can be filled with municipal type water, and which will remove impurities (e.g. chlorine) from that water. The portable drinking device is designed so that a person can carry around a single drinking device, fill that drinking device with type water (e.g. from a faucet), and yet have a portable water source more suitable to that person's water quality preferences. The portable drinking device has an integrally contained filtration component, designed for filtering water that is drawn or otherwise delivered from the device through a drinking tube or other delivery mechanism, and in a way designed to ensure that all water obtained from the device is passed through the filtration component to remove the desired impurities. In addition, some applications of this design will include a filtration component with a filter media that can be conveniently replaced, so that the same portable drinking structure can be used and reused, while other applications may include a filtration component designed as a single use, disposable filter.

5 Claims, 1 Drawing Sheet

PORTABLE DRINKING DEVICE

BACKGROUND

The present invention relates to a portable drinking device, and particularly to a portable container for water or other liquid designed to remove chemical, physical or other impurities from a liquid, and to provide a portable source for consumption or other use.

In municipal water systems, potable municipally treated water is typically provided by adding certain materials (e.g. chlorine) to the water system to bring the water system to a level that, by general community safety standards, is suitable as potable water. In addition, in water systems in which water is drawn from a well, the water is generally treated (e.g. by addition of chlorine) to bring the water to a level that is suitable as potable water. In this application, reference to "municipal type" water means water that is municipally treated, well water that is treated, or any other water that is treated to bring the water to a level that makes the water suitable as potable water.

While municipally type water is intended to be potable, by community standards, for many people municipal type water is not of a quality that they desire as drinking water. For example, while chlorine is commonly used to remove certain organisms in municipal water systems, chlorine is an impurity in the municipal water, which many people object to have in their drinking water. Thus, in many home water systems, various types of filters and treatments are provided, to remove chlorine and other materials from the water, to further purify the water in the system. For example, in home water systems, it is known to force water from a municipal source to flow through a filtering system including a carbon filter to remove impurities such as chlorine from the water.

In the applicants' experience, for people desiring to carry with them a portable source of drinking liquid (e.g. drinking water), it is typical for those people to buy bottled water that they can carry around with them. Once they have finished a water bottle, either they have to discard the bottle, and open another bottle, or fill the empty bottle with water from a source likely to provide municipal quality water. However, in the applicant's experience, it is not known to provide a portable water bottle with a way of removing impurities from water contained in the bottle, to provide a portable source of drinking water that can be refilled from a municipal source, and still provide a portable source of drinking water that is cleaner than what a person can get from a municipal source. The applicants believe there is a need for a portable water bottle that can be regularly filled with municipal quality potable water, and which will remove impurities (e.g. chlorine) from that water.

SUMMARY OF THE PRESENT INVENTION

The present invention provides a portable drinking device that can be regularly filled with municipal type water, and which will remove impurities (e.g. chlorine) from that water. With the present invention, a person can carry around a single drinking device, fill that drinking device with municipal type water (e.g. from a home or municipal faucet), and yet have a portable water source more suitable to that person's water quality preferences.

According to the present invention, a portable drinking device has an integrally contained filtration component, a delivery component, and a storage component. The portable drinking device is designed for filtering water that is drawn from the device (e.g. through a drinking tube), and in a way designed to ensure that all water drawn from the device is passed through the filtration component, to remove the desired impurities.

In addition, with the preferred embodiment, the filtration component can be permanent or conveniently replaced, so that the same portable drinking device can be used and reused or can be designed to be disposable with municipal quality water, and provide a convenient and portable source of drinking water.

In this application, reference to a "portable drinking device" means a portable bottle, bladder, canteen, or other drinking container that can be carried by a human or animal, or attached to an article (such as a belt, backpack, strapping system, shoulder sling or similar article) that is carried by a human or animal and which is designed to provide a safe source of transportable drinking water for a human or animal.

Further features of the present invention will be apparent from the following detailed description and the accompanying drawings.

DETAILED DESCRIPTION

As described above, the present invention relates to a portable drinking device with a filtration component designed to remove impurities (e.g. chlorine) from water in the device, and to provide a portable drinking device in which municipal quality water can be filtered before it is drawn from the device.

The principles of the present invention are described below in connection with a portable water bottle. However, it will be clear to those in the art that the principles of the present invention can be applied to various types of portable drinking devices.

As shown in the figures, a portable water bottle 100 includes a container 102 for a body of water, and a drinking tube 104 or other means for delivering (e.g. drawing) water from the container. The drinking tube 104 extends through an opening in the top 106 of the bottle. The drinking tube 104 normally has a relatively snug fit with the opening in the top 106 of the container, so that the drinking tube 104 normally stays in a predetermined position in the container. However, when it is desirable, or necessary, to replace the drinking tube, the drinking tube can be slid through the opening, removed from the container, and replaced with another drinking tube. Moreover, one manner in which the drinking tube 104 can be coupled with or removed from other components of the bottle is described further below.

If the bottle has a removable cap coupled to the container, the drinking tube is coupled to the cap, so that the cap and drinking tube can be removed and replaced in the bottle as a unit.

Figure 1:
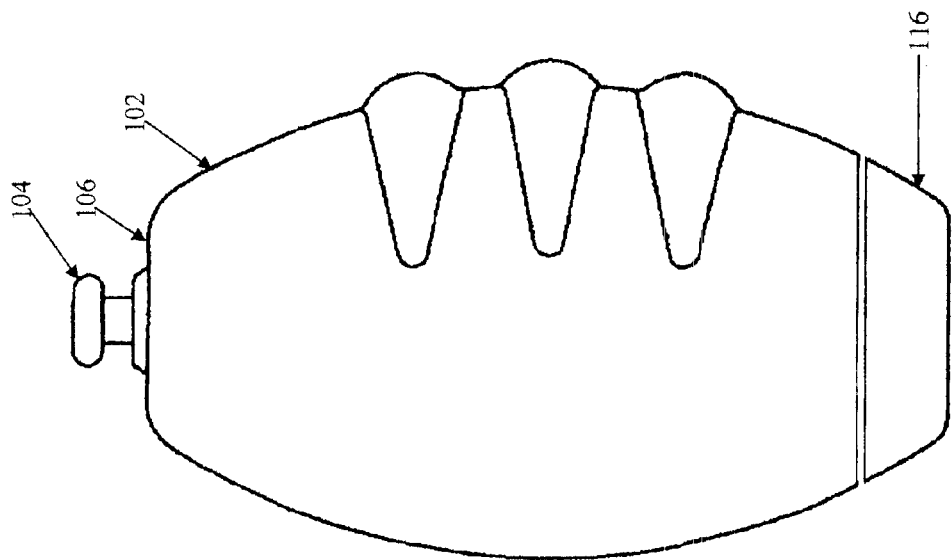
FIG. 1 is a side view of a portable drinking device according to the present invention.
Figure 2:
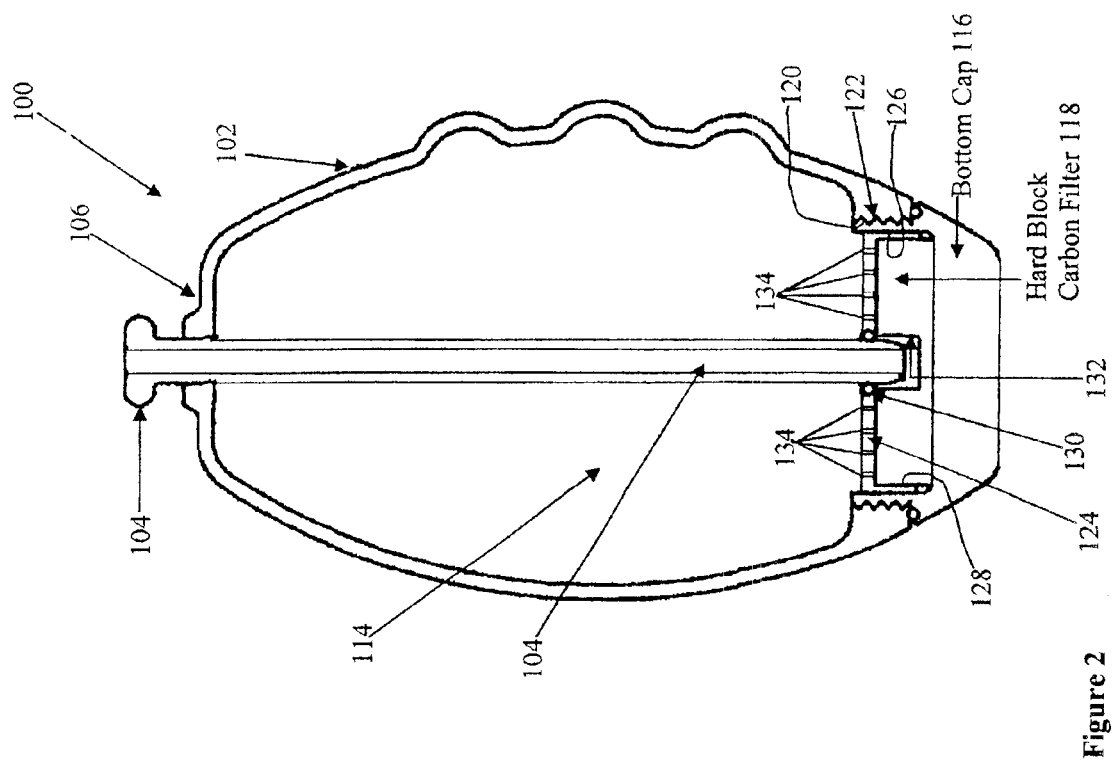
FIG. 2 is a cross sectional view of the portable drinking device according to the present invention.

The container 102 has a water chamber 114 for receiving and storing water, and the bottle also has a bottom cap 116 that, in this embodiment can be selectively coupled with and removed from the container 102. The bottom cap 116 has a filter 118 that is coupled with the bottom cap in a way such that the bottom cap and filter 118 can be separated from or coupled to the container 102 as a unit. Moreover, the filter 118 can be removed from the bottom cap 116 when the bottom cap is separated from the body; so that the filter 118 can be selectively replaced. As seen from FIG. 2, the bottom cap 116 has threads 120 that can engage mating threads 122 on the container 102, to enable the bottom cap/filter unit to be separated from or coupled to the container 102. Alternatively, the bottom cap/filter unit can be designed as a disposable unit that is coupled to the container 102 in the manner described above, and is discarded and replaced by another disposable unit.

A filter-locking cup 124 that has a tight fit with an interior wall 126 of the bottom cap also has a recess 128 dimensioned for a tight fit with the exterior of the filter 118. Thus, the bottom cap 116, filter locking cup 124 and filter 118 can be coupled to or removed from the container 102 as a unit. When the bottom cap/filter locking cup/filter unit is removed from the container 102, the filter 118 can be separated from the filter-locking cup 124, and replaced with a similar filter. The bottom cap/filter locking cup/filter unit can then be coupled to the container 102.

The drinking tube 104 extends through the filter-locking cup 124, and an o-ring or similar seal 130 provides a resilient but relatively fluid tight seal between the filter locking cup 124 and the drinking tube 104. A pliable rubber material, such as available from KX Industries, L.P., of Orange, Conn., is preferably used for the seal 130. The resilience of the o-ring seal 130 means that with enough force the drinking tube 104 can be separated from or coupled with the filter-locking cup 124. Thus, the drinking tube 104 can be separated from the filter-locking cup 124 when the bottom cap/filter locking cup/filter unit is separated from the container 102. Moreover, the resilience of the o-ring seal 130 enables the drinking tube 104 to be conveniently coupled to the filter-locking cup 124 when the bottom cap/filter locking cup/filter unit is being coupled to the container 102.

The filter 118 is a section of hard block carbon filter or a similar medium that is sized to fit in the filter-locking cup 124 with a relatively tight fit. The filter 118 includes a central cavity 132 (or water reservoir) into which the distal end of the drinking tube extends. The filter-locking cup 124 has a plurality of fluid passages 134 which provide fluid communication between the water chamber 114 and the filter 118. Because the filter 118 is at the bottom of the chamber, water from the water chamber 114 can flow by gravity into the filter 118. However, the o-ring seal 130 between the drinking tube 104 and the filter locking cup 124 means that water can be drawn (i.e. sucked) from the reservoir 132 through the drinking tube 104, but water from the water chamber 114 can only reach the reservoir 132 by passing through the hard carbon block filter 118. Thus, any water that is drawn from the container 102 is water that has been filtered by the hard carbon block filter 118.

The hard carbon block filter 118 is preferably a block of fused carbon having a thickness in the range of 1 to 2 inches, such as available from KX Industries, L.P., under the trademark MATRIKS. The fused carbon filter 118 must be saturated with water, in order for filtered water to reach the reservoir 132. Thus, when a container 102 of water is initially placed in the water chamber 114, e.g. from a municipal water source such as a drinking fountain or a home faucet, there is a short time period required in which the water must soak into and saturate the hard carbon block filter 118, before the filtered water will reach the reservoir 132 and be available for drinking. However, once the water has saturated the hard carbon filter 118, there is a regular flow of filtered water into the reservoir 132 as water is being drawn from the reservoir. Thus, once the hard carbon filter has been saturated, the bottle provides a regular source of filtered water that can be drawn from the reservoir 132.

In order to fill the container with municipal type of water, the bottom cap/filter locking cup/filter unit is removed from the bottom of the container 102, and the container is filled with water. Then, the bottom cap/filter locking cup/filter unit is replaced, and the water allowed to saturate the filter 118, to provide cleaned water that can be drawn from the reservoir 132.

The hard block carbon filter 118 is capable of removing impurities such as chlorine from otherwise potable municipal quality water. Moreover, the hard block carbon filter 118 is capable of removing particulate matter having a turbidity of less than one from water. Other filter media may be used in this design to obtain specific performance properties for different applications and/or water sources.

The portable container is preferably molded of FDA approved synthetic resin, such as low-density polymethamine, with a wall thickness that will not cause leaching by the liquid it contains. The synthetic resin will also preferably use an FDA white or other approved colorant. The drinking tube, bottom cap and filter-locking cup are preferable molded of the same synthetic material.

Accordingly, the foregoing description provides a portable drinking device which can be filled and refilled with municipal type water, and which can filter impurities from the municipal type water, to provide a portable, refillable, and reusable source of filtered drinking water. Those in the art will readily appreciate that in some applications of the principles of the present invention, a portable drinking device can be provided in which the filter media can be conveniently replaced, so that the same portable drinking structure can be used and reused, while other applications may include a filtration component designed as a single use, disposable filter.

With the foregoing disclosure in mind, various ways to construct a portable drinking device in accordance with the principles of the present invention will become apparent to those in the art.

What is claimed is:

1. A container comprising:
   an upper end with an upper opening;
   a lower end with a lower threaded opening;
   a cap threadedly received in said lower threaded opening for closing said lower opening, wherein said cap comprises a recess;
   a carbon block filter having a central cavity;
   a filter locking cup defining a central cavity, said cup comprising a top wall with a central opening and a plurality of passages surrounding the central opening;
   wherein said carbon block is disposed within the central cavity of said cup with said central cavity of said carbon block disposed adjacent said central opening in the top wall of said cup;
   wherein said cup is disposed within said recess of said cap such that said central opening of said cup faces said upper opening of the container;
   a drinking tube extending through said upper opening of said container and through said central opening in said top wall of said cup and into said central cavity in said carbon block.

2. The container of claim 1, further comprising an o-ring disposed between said drinking tube and said central opening in said top wall of said cup.

3. The container of claim 1, wherein said carbon block is removeably disposed within said cavity of said filter locking cup.

4. The container of claim 1, wherein said carbon block comprises fused carbon.

5. The container of claim 4, wherein said carbon block is between 1 and 2 inches thick.

* * * * *